INVENTORS
Willard J. Hatton
and Ralph A. Sherman
by Hooper, Leonard & Glenn
their attorneys

INVENTORS
Willard J. Hatton
and Ralph A. Sherman
by Hooper, Leonard & Glenn
their attorneys

INVENTORS
Willard J. Hatton
and Ralph A. Sherman

INVENTORS
Willard J. Hatton
and Ralph A. Sherman

UNITED STATES PATENT OFFICE 2,653,555

DOWNFLOW STOKER-FED FURNACE SYSTEM FOR BITUMINOUS COALS

Willard J. Hatton and Ralph A. Sherman, Columbus, Ohio, assignors, by mesne assignments, to Bituminous Coal Research, Inc., Washington, D. C., a corporation of Delaware Application May 16, 1949, Serial No. 93,562

6 Claims. (Cl. 110—118)

This invention relates to an automatic stoker-fed furnace system capable of burning a wide range of kinds and sizes of bituminous coals and the like under varying heat demand conditions. More particularly, it relates to a new and practical furnace system for residences and small buildings in which fuel and combustion air are fed downwardly and freely burned without the material formation of caked masses and clinkers. This new furnace system is also susceptible of use in connection with conventional temperature responsive control circuits.

Unlike many industrial applications having a constant and high heat demand, furnace systems suitable for residences have to be readily responsive to demands varying from territory to territory, from season to season, from daytime to nighttime, and from building heating only to household water heating as well to mention some of the possible variations. Thus, a residential furnace system may have to go from a hold-fire condition to full heat demand and return in a relatively short period of time. In a typical control for such a furnace system, a demand for heat by a master thermostat initiates a full heating cycle during which fuel and combustion air are fed to the furnace for the necessary period required to satisfy that demand. In many cases, this full operation carries on beyond the "on" period, during which fuel is fed to the furnace. When the call for temperature is satisfied, the furnace system is returned in the usual case to a hold-fire condition. A timer or temperature responsive switch is commonly included in the circuit to periodically feed enough fuel to the furnace system during hold-fire operation to avoid an out-fire. Thus it is that both during heat-demand operation and during hold-fire operation there are "on" and "off" periods for the fuel and generally for the combustion air fan also. Any intermediate heat demand in the case of conventional systems may be met by the operation of the furnace under full demand conditions for a shorter period.

Solid fuels such as anthracite coals have long been used in such residential stoker-fed furnace systems under substantially fully automatic conditions. Such anthracite coals are well suited for this purpose inasmuch as they are regarded as non-caking, non-coking and non-clinkering. Inherently, they are relatively smokeless and lend themselves to uniform sizing. Bituminous coals, on the other hand, differ widely in matters of composition, caking, coking and clinkering characteristics. Bituminous coals such as those from the Illinois No. 6, the Pittsburgh seam, the Pocahontas No. 3 bed and Dorothy and Ohio No. 8 beds illustrate the various combinations of these properties which bituminous coals have to varying extents. Inherently, bituminous coals generally present a smoke emission problem and the sizing of such coals is far less precise and uniform than is the case with anthracite fuels. Thus, bituminous coals supplied as "stoker coal," for domestic stokers, may vary between the approximate size limits of from about 1¼" maximum to ⅛" minimum, a wide size consist in terms of the combustion reactivity of the size gradations present in such a consist.

While bituminous coals with troublesome agglomerating characteristics may be caused to act as a "free-burning" fuel at rates approximating maximum rates of burning, full advantage could not be taken of this knowledge in conventional residential furnace systems because either the heat output would be beyond the needed requirements or the high temperatures produced would fuse the ash to a degree where it might even become attached to the inside of the furnace, or both results would occur. Such rates of burning may be measured in terms of pound weight of fuel burned per square foot of ignition plane area per hour in a furnace system. Further, in conventional furnace systems for bituminous coal, the fuel bed is seldom uniform and frequently channels, developments which increase the likelihood of objectionable sooting on the heat transfer surfaces and smoke emission. Hence it is that under the fluctuating demands of such smaller furnace systems aggravated by the varying trouble-giving properties of bituminous coals, no practical stoker-fed furnace system has heretofore been devised for operation in homes and small buildings under substantially fully automatic conditions. It is a common experience in those bituminous stoker-fed furnace systems in homes today for caked masses and "coke trees" to form; for clinker to be constantly produced which must be broken up and manually removed; and for out-fires to occur especially during hold-fire operation.

In the furnace system of this invention, these difficulties are overcome and a practical, substantially fully automatic furnace system employing a variation of the underfeed principle is provided for such uses. This new furnace system will burn different kinds and sizes of bituminous coal in equilibrium and in a fuel bed of relatively constant depth under each of the fluctuating demands placed thereon in the course of its operation. In the sense used herein, equilibrium burning occurs when the fuel bed for a given rate of primary combustion air maintains substantially the same character of combustion and thickness. To accomplish such equilibrium with coals having agglomerating properties, such coals must be made to burn in a free-burning, that is, in a non-caking manner. It is made possible principally because this new furnace system produces a higher rate of burning at least during the "on" periods of the control circuit than is possible as a practical matter in any conventional residential furnace system employing the underfeed combustion principle. During such higher rates of burning, the agglomerating properties of the coals used are so reduced that no material caking occurs to disturb equilibrium and upset the furnace system. All volatile and tarry matters must pass through the fuel bed, that is, the live fuel bed between the plane of ignition and the grate, for effective mixing with combustion air and burning, yielding increased heat release and minimizing or eliminating smoke emission.

Further, a zone of discontinuity is provided between the plane of ignition and the fresh fuel to decrease any agglomerating tendency such as occurs in conventional furnace systems when the fresh unignited fuel remains in continuous contact with the live fuel bed. This zone of discontinuity is obtained by dropping the relatively cool fresh fuel downwardly on the top of the fuel bed. Combustion air or at least the primary portion thereof in the correlative weight for the weight of fuel being fed is also fed downwardly to the top of the fuel bed which is confined and hence restricts the area of the jagged surface or zone commonly termed the plane of ignition. Any tendency for the rate of ignition measured in weight of fuel fed per square foot of area at the plane of ignition per hour to exceed the rate of burning in the furnace system may be suppressed by presetting the control circuit to feed a predetermined lesser weight of fuel per hour to the furnace system.

In common furnace control circuits, such as those which are usually preset when installed and seldom if ever changed, this equilibrium cannot be accomplished in any practical way by slowing the coal feed or by shortening the respective "on" periods when the control is used with conventional stoker-fed furnaces. The tendency for the rate of ignition to exceed the rate of burning and upset the equilibrium and free-burning of the fuel bed is most likely to occur during hold-fire conditions, although it may also occur under heat-demand conditions when wide size consists are used.

Provision is also made in the new furnace system for agitation and downward movement of the fuel bed and for downward sifting and removal of ashes. Relatively rapid transfer of heat from at least the lower portion of the fuel bed minimizes the formation of clinker and such smaller fused ash particles as may occur are ground sufficiently fine to be readily removable automatically from the furnace. Appropriate vertical heat transfer surfaces increase the boiler efficiency and avoid any tendency for fly ash or fly carbon to be deposited and impair such transfer.

Other objects and advantages of this invention will be apparent from the following description and drawings, which are illustrative only, in which.

General embodiment

The general construction of a furnace system and furnace made in accordance with this invention is illustrated in Figures 1 to 3A. Fresh fuel is fed to the furnace through a conveyor conduit 10 in response to a heat demand or combustion maintenance demand during hold-fire. Conduit 10 opens through zone 12a into the top of a tubular combustion chamber 11 so that such fresh fuel drops to the top of the fuel bed therein. Thus, the supply of fresh fuel in the conveyor conduit 10 is never in contact with the fuel in the fuel bed because of the spatial discontinuity deliberately provided by zone 12a. The combustion air is fed into combustion chamber 11 through a port 12 to the fuel bed in the same direction as the fresh fuel. In this embodiment, a restricted portion 13 of combustion chamber 11 is fashioned in frusto-conical shape, a matter the significance of which is more fully treated in United States patent application Serial No. 98,484, filed June 11, 1949, in the name of Willard J. Hatton and Henning M. Carlson. The confined portion of combustion chamber 11 including portion 13 is lined with a refractory 34 to assist in maintaining ignition during hold-fire periods when minimum heat output to maintain combustion is all that is needed.

Figure 1:
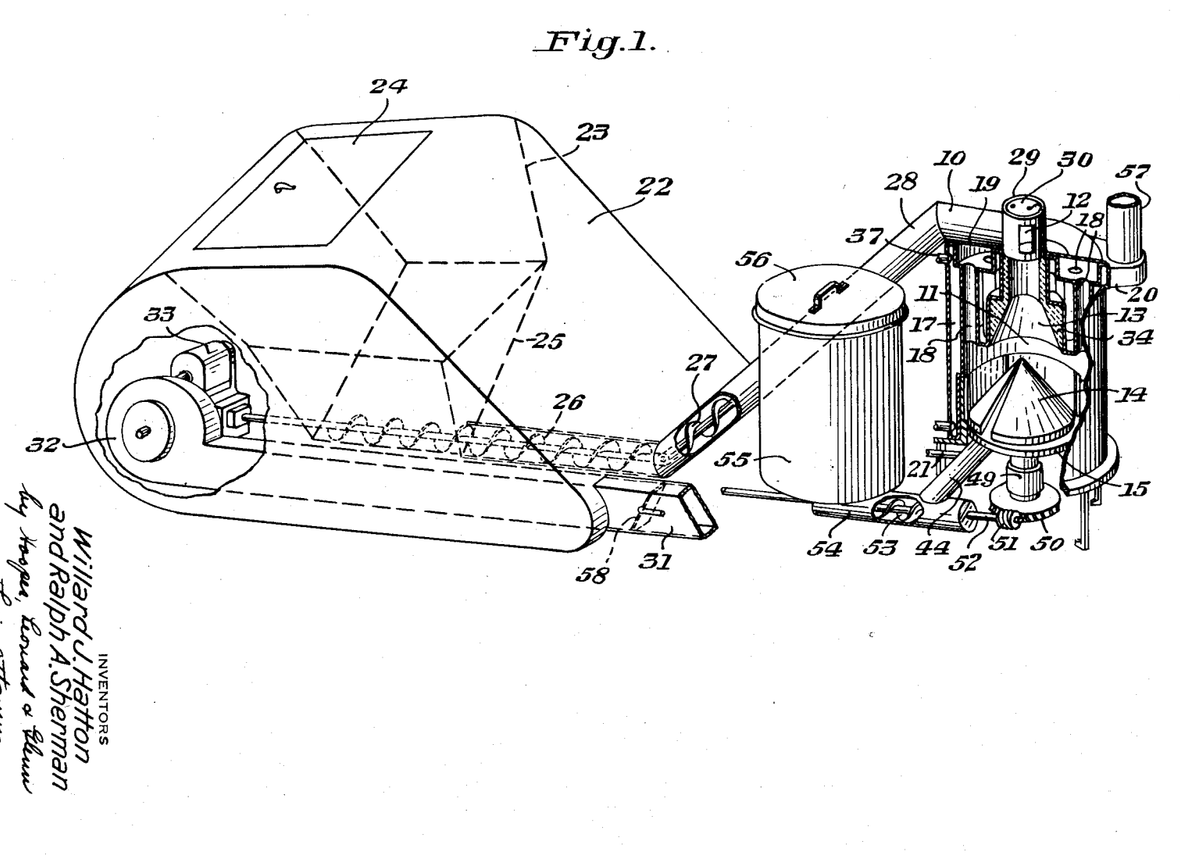
Figure 1 is a furnace system assembly embodying this invention.
Figure 2:
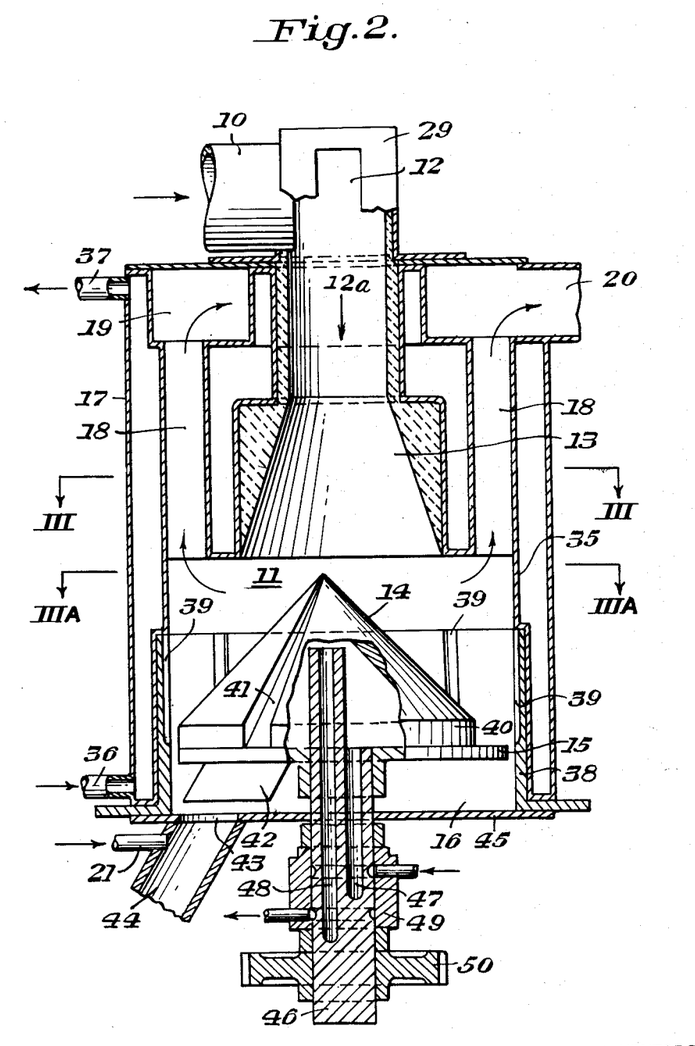
Figure 2 is an enlarged view in vertical cross section of the furnace shown in Figure 1.
Figures 3, 7, 7A:
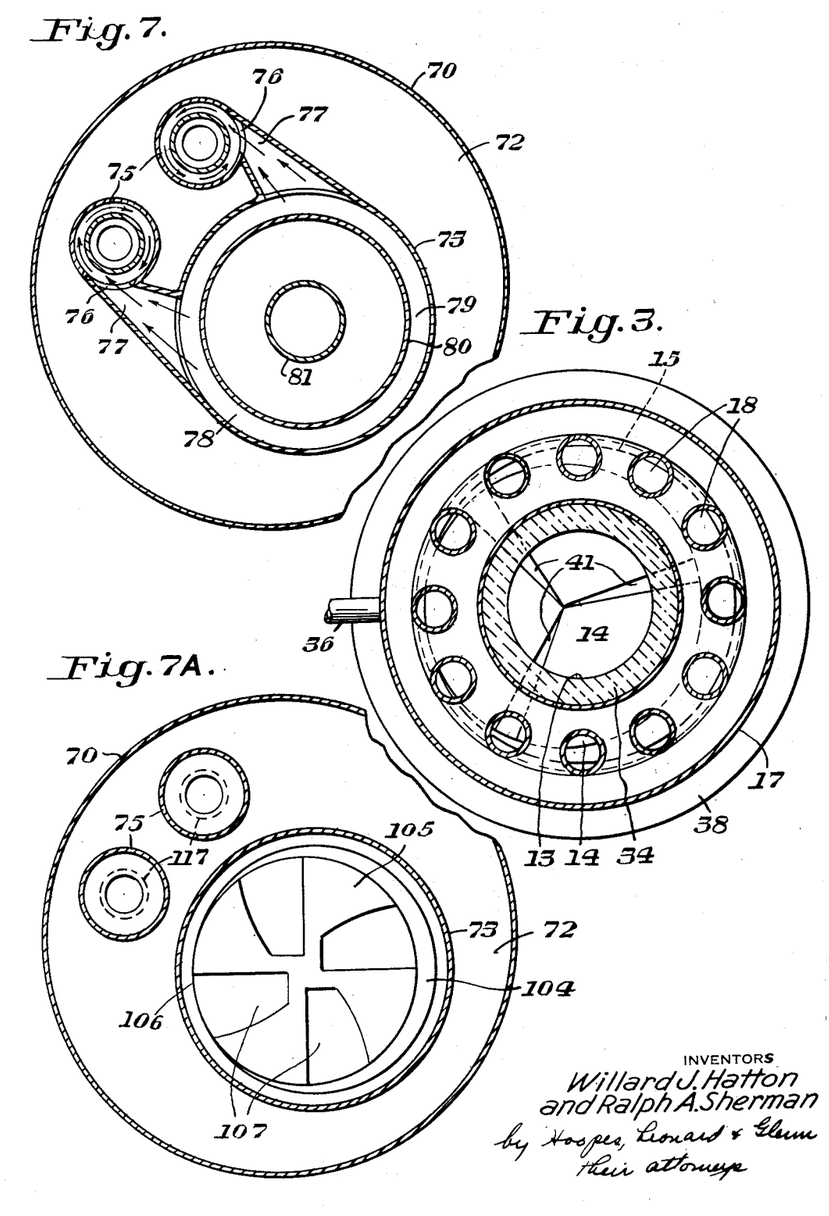
Figure 3 is a view in horizontal cross section taken substantially along line III—III of Figure 2.
Figure 7 is a view in cross section taken substantially along line VII—VII of Figure 6.
Figure 7A is a view taken along line VIIA—VIIA of Figure 6.
Figure 3A:
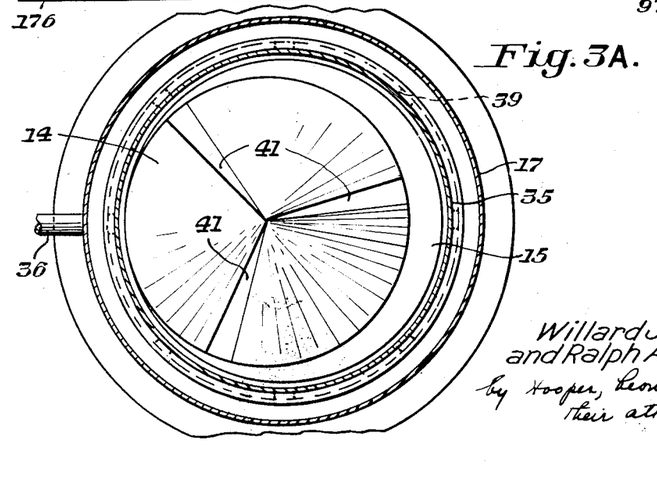
Figure 3A is a view in horizontal cross section taken substantially along line IIIA—IIIA of Figure 2.
Figure 4:
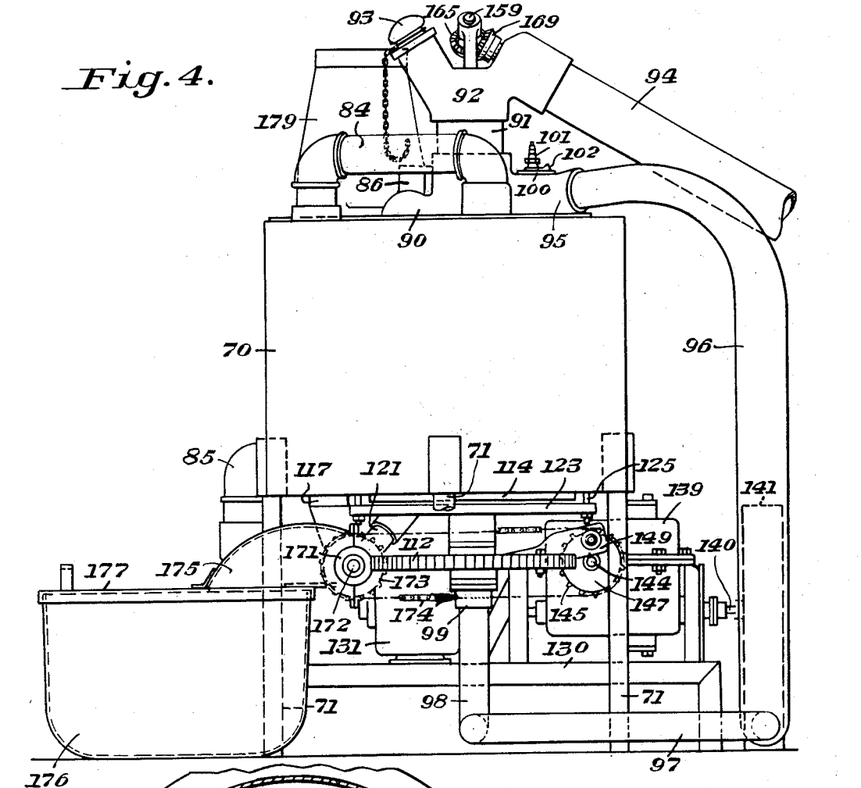
Figure 4 is a view in elevation of an embodiment of this invention particularly suitable for use in residences and small buildings.
Figure 5:
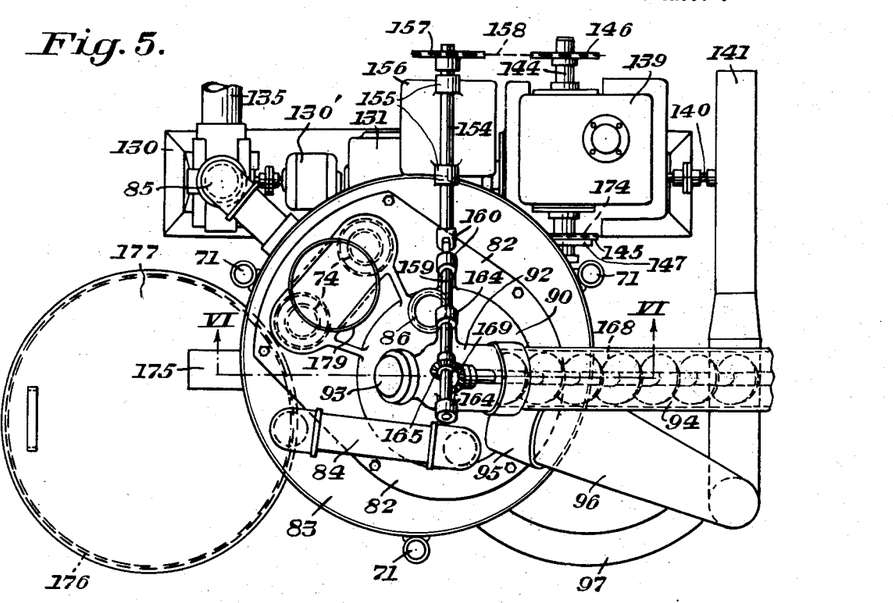
Figure 5 is a plan view of the furnace system shown in Figure 4.
Figure 6:
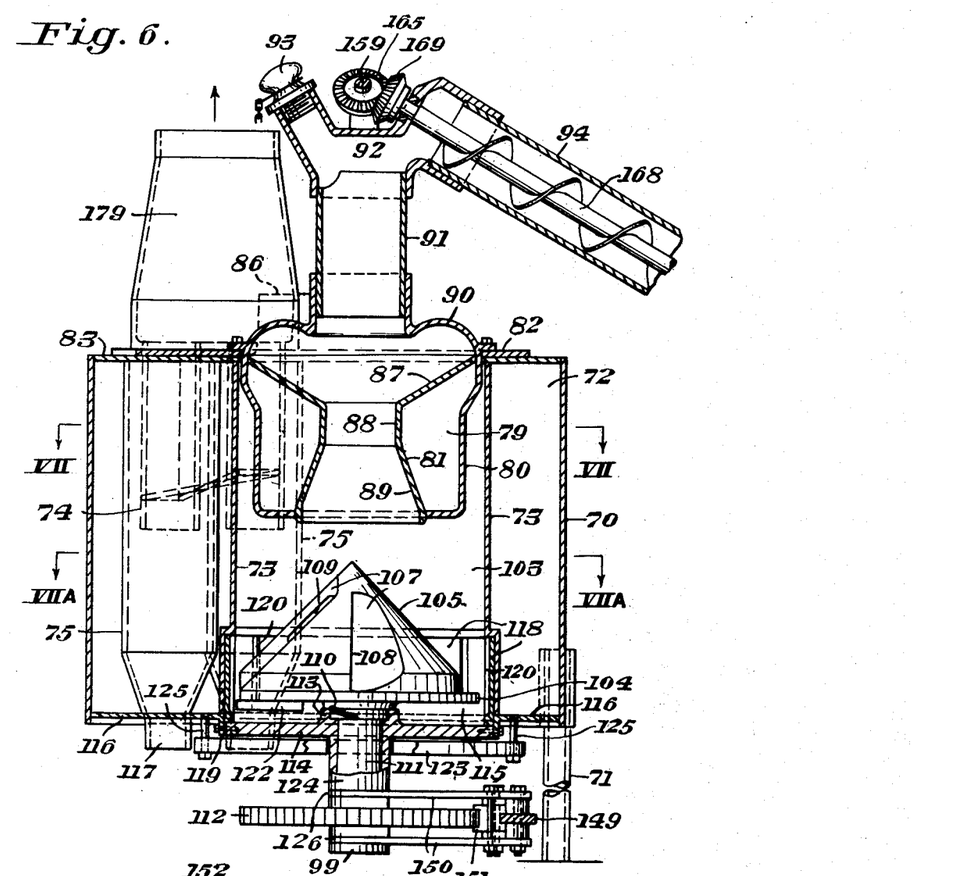
Figure 6 is a view in vertical cross section taken along line VI—VI of Figure 5, omitting the driving and ash removal mechanism.
Figure 6A:
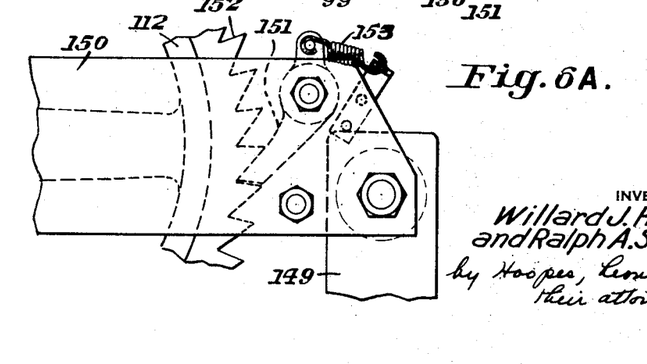
Figure 6A is an enlarged fragmentary plan view of the ratchet mechanism for rotating the grate shown in Figure 6.
Figure 8:
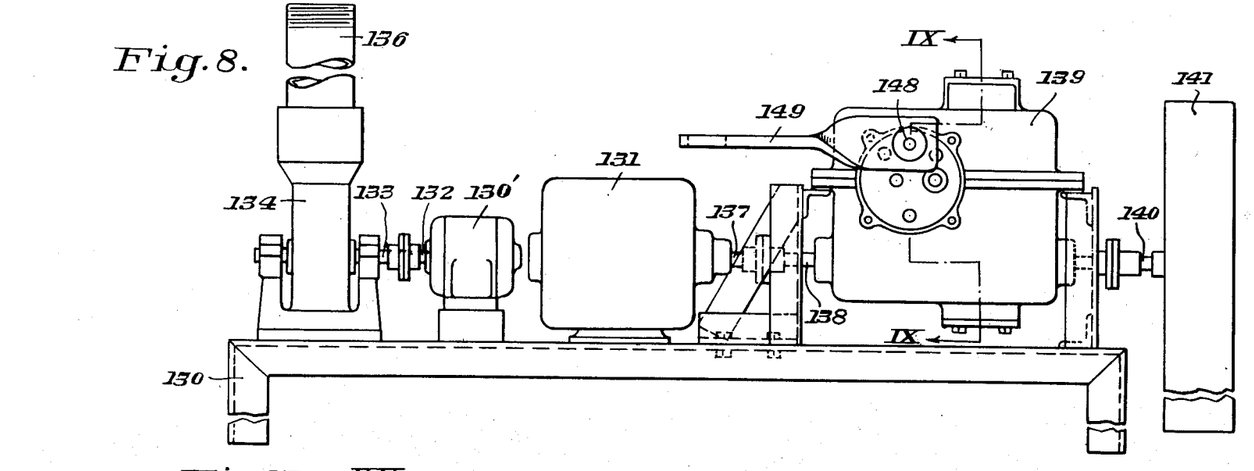
Figure 8 is a view in elevation and partly in cross section of the driving mechanism shown in Figures 4 and 5.
Figure 9:
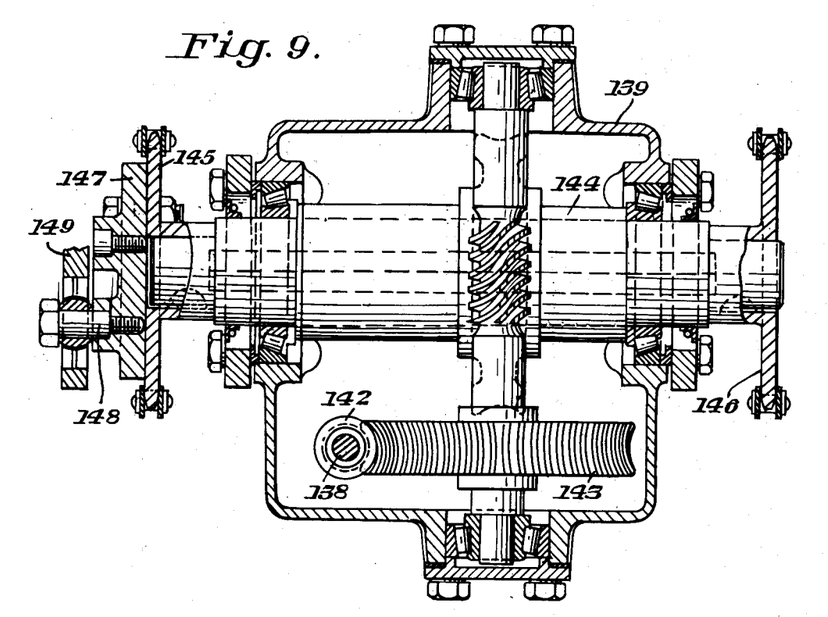
Figure 9 is a view in vertical cross section taken along line IX—IX of Figure 8.
Figure 10:
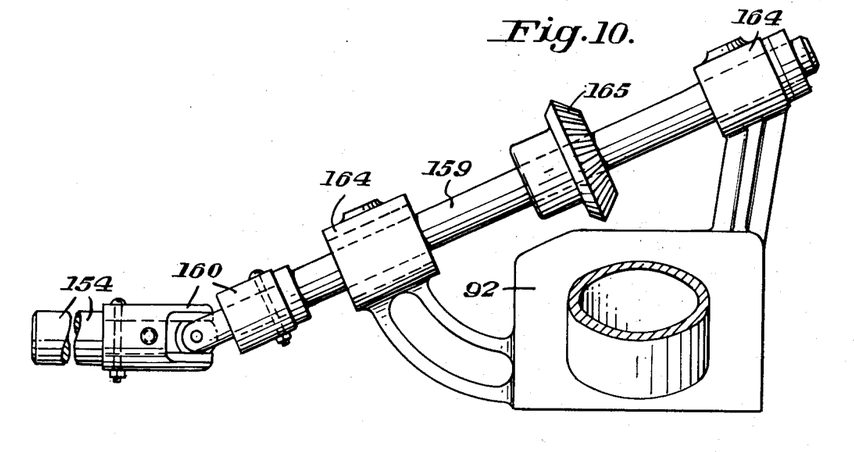
Figure 10 is a partial view in elevation of the coal-feed mechanism shown in Figure 4.
Figures 11, 12:
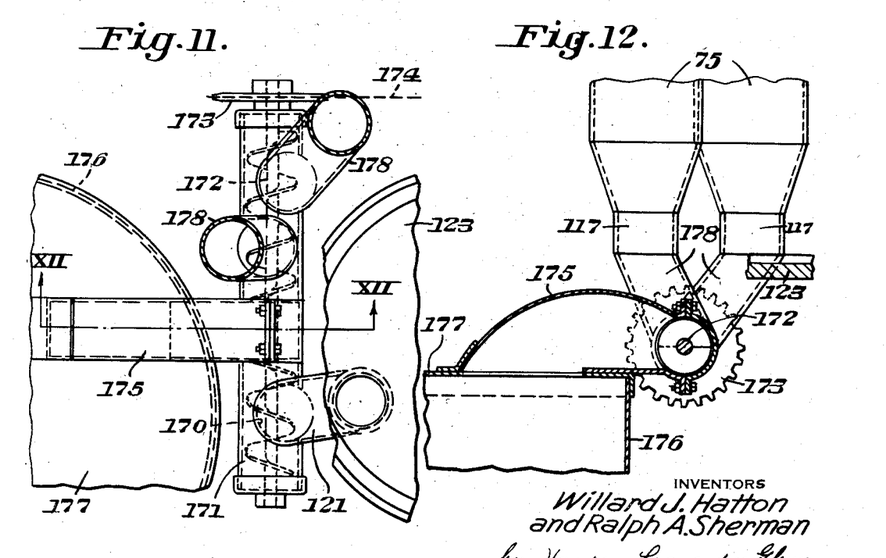
Figure 11 is a partial view in side elevation of the ash-removal assembly.
Figure 12 is a vertical cross sectional view taken substantially along line XII—XII of Figure 11.
Figures 13, 14, 15, 16:
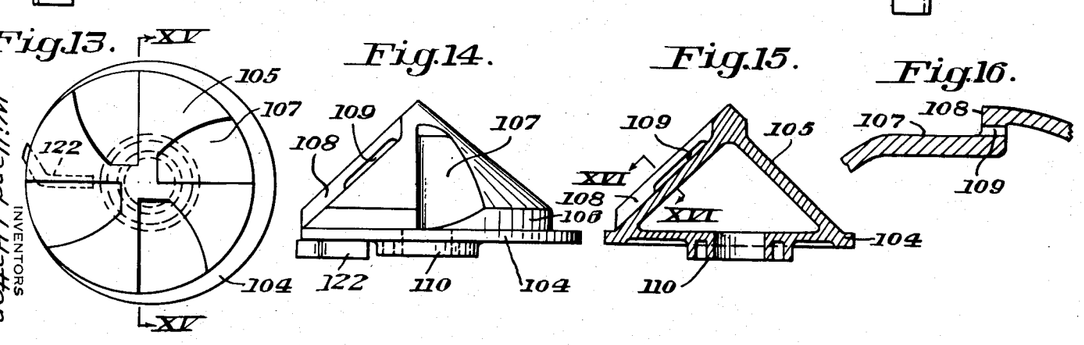
Figures 13 to 16 inclusive are elevational and sectional views of the grate mechanism shown in Figure 6.

The furnace illustrated in Figures 2 to 3A may be employed in a general assembly as shown in Figure 1. In this assembly a fuel bin 22 has a hopper 23 therein to which access is provided by a cover 24. Hopper 23 has a lower converging portion 25 surrounding a feed screw 26 which is universally coupled to an inclined extension 27 thereof. Extension 27 is enclosed within a conduit 28 joined at its upper end to the outer end of conduit 10. Conduit 10 in turn empties into a turret 29 closed by a cover 30 directly above combustion chamber 11. Port 12 in turret 29 is connected by a duct (not shown) to duct 31 leading to an air blower 32. Feed screw 26 and blower 32 are both turned by an electric motor 33. A suitable clutch is interposed between motor 33 and feed screw 26.

The lower end of combustion chamber 11 broadens out around a conical grate 14. Grate 14 is supported in fixed, eccentric position on a rotating base 15. Ash passes between base 15 and the lower portion 35 of an annular boiler or water jacket 17 into an ash pit 16 where it is removed.

Jacket 17 surrounds combustion chamber 11, the grate 14, base 15 and ash pit 16. A plurality of vertical annularly disposed flue tubes 18 pass through jacket 17 between the top thereof and the offset portion thereof at the top of the broadened part of combustion chamber 11. In this way, gaseous combustion products, which include any vapors and entrained material therein, pass through the live fuel bed substantially beginning at the plane of ignition in portion 13, around said projecting part of jacket 17 and upwardly through tubes 18 and out through a flue collar 19 and a stack 57, resulting in high rates of heat transfer to the water, or other suitable heat absorbing fluid, in jacket 17, without deposition of soot or fly ash on the internal surfaces of the tubes. Water enters jacket 17 through a line 36 and after circulating through the jacket and absorbing heat leaves jacket 17 through a line 37 connected to a hot-water radiator or other type of heating system for the household or small building in which the furnace is installed. A second electric motor (not shown) forces water at a predetermined rate through said jacket.

The lower end of jacket 17 absorbs heat directly from the lower portion of the fuel bed, thereby aiding in the maintenance of temperatures at least in the lower portion of the fuel bed which discourage any material formation of clinker by the melting or fusion of ash. Additional cooling in the lower portion of combustion chamber 11 may be obtained if desired by the provision of some supplemental combustion air through a line 21 and ash pit 16. Such supplemental combustion air will also mix up and burn any combustible which might otherwise tend to be present in the ash and in the gaseous combustion products. Normally, such supplemental combustion air would not be in excess of one-quarter by weight of the combustion air supplied to the furnace through port 12.

A metal liner 38 surrounds the lower portion of combustion chamber 11 in contact with lower wall 35. The inside of liner 38 is in vertical registry with wall 35 above it so that fly ash may have substantially no non-vertical surface or "land" on which to deposit in the furnace. A series of vertical grooves 39 are disposed around the inside of liner 38 and cooperate with a plurality of grooves 41 in grate 14 and with its lower vertical edge 40 to break up such small clinker particles as may form. Sufficient clearance is left between the edge of base 15 and the interior of liner 38 so that only readily removable ash falls into ash pit 16. A sweep 42 is adjustably affixed to the underside of base 15 and pushes ash out of ash pit 16 through an opening 43 leading into an ash removal duct 44. A bottom plate 45 closes the bottom of ash pit 16 and of the furnace. Suitable lagging may be provided for all exposed portions of the furnace.

Base 15 is rigidly mounted on a hollow rotatable shaft 46 having passages 47 and 48 therein through which cooling water may be circulated if, under the particular circumstances of a given furnace, the temperature in the lower portion of the fuel bed tends to be too high. Appropriate bearings 49 are provided for the journaling of shaft 46. A worm wheel 50 is keyed to the lower end of shaft 46 and is engaged by a worm gear 51 at the end of a shaft 52 or by a suitable ratchet drive. Shaft 52 is also provided with an ash removal feed screw 53 in a conduit 54. Duct 44 opens into conduit 54 so that the turning of shaft 52 either by motor 33 through appropriate connections (not shown) or otherwise, not only rotates grate 14 but also causes the ash to feed into an ash receiver 55 having a cover 56.

At the commencement of a heating season or following an out-fire, if an automatic igniter is not employed, the furnace illustrated in Figure 2 may be manually ignited by removing cover 30 and filling combustion chamber 11 to the appropriate level in portion 13 with coke or charcoal and sufficient kindling to be readily ignited by a match or other lighter when air is fed to the bed by starting motor 33 with the clutch to feed screw 26 disengaged. After the kindling and starting fuel bed becomes ignited, the clutch is engaged and regular operation of the furnace system commences. Thereafter, this furnace system under the control of its preset conventional control circuit and a preset damper 58 in duct 31 will operate in equilibrium during heat demand and hold-fire periods. In this operation combustion air normally in excess of that required for theoretical perfect combustion for the weight of fuel fed is supplied through port 12 at ambient temperature or preheated. If preheated, as is well understood, the reactivity of the operation is increased and the presetting of the control circuit will make due allowance therefor. All fresh coal fed to this new system is relatively rapidly ignited and burned at a high rate in relation to any previously known furnace systems for such use. Such high rate burning continues at least until all troublesome caking tendencies are suppressed. Thereafter, as in the case of an "off" period during hold-fire operation, the chimney effect induced by the draft through stack 57 will normally provide sufficient air for the maintenance of combustion. Some additional combustion air, if desired, may be supplied during such "off" periods. The plane of ignition of the fuel bed will remain in the confined portion of combustion chamber 11 at all times in order to realize the full advantages of this invention. If that confined portion has vertical sides throughout the length thereof, a greater excess of combustion air will usually be required for optimum operation.

*Further embodiment*

A further embodiment of this invention is illustrated in Figures 4 to 16 inclusive, and is particularly suitable for homes and small buildings. In such embodiment, a cylindrical casing 70 is mounted on legs 71. A substantially annular Outer jacket 72 fits in casing 70 and contains water or other high heat transfer fluid. Jacket 72 has an inner metal vertical wall 73 somewhat eccentrically placed in casing 70 as illustrated in Figure 7. Two vertical cyclones 74 pass through the interior of jacket 72 from top to bottom adjacent the position in which wall 73 is farthest from casing 70. Cyclones 74 are provided with casings 75, which are sealed and have no communication with the interior of jacket 72, and with respective tangential inlet openings 76 oppositely disposed relative one another. Outwardly expanding passages 77 connect each opening 76 with that portion of a combustion chamber 78 which is immediately adjacent the upper part of wall 73. An inner jacket 79 of an irregular annular shape having an outer wall 80 and an inner wall 81 is positioned concentric to wall 73 in the top of casing 70 where it is supported by a cover 82 bolted to a top plate 83 forming the top of casing 70 and jacket 72. Jacket 79 is interconnected to jacket 72 by a water line 84. Water enters jacket 72 adjacent the bottom thereof through a line 85 and leaves jacket 79 through an outlet 86.

Wall 80 is spaced from wall 73 to enable gaseous combustion products to transfer heat to the water in jackets 72 and 79 respectively through metal walls 73 and 80. Inner wall 81 outwardly flares at the top 87 thereof, is tubular in character at an intermediate portion 88 and assumes a tubular frusto-conical shape at a lower portion 89 thereof. Flared portion 87 is closed by a domed cover 90 having a centrally rising duct 91 therein which is capped by a double outlet member 92, one of which outlets is sealed by a plug 93 which is removable for inspection and, if required, manual ignition purposes. The other outlet of member 92 is connected to a coal feed screw conduit 94. An outlet 95 in cover 90 is connected to a primary combustion air inlet duct 96. A smaller duct 97 branches off from duct 96 and is coupled to a vertical duct 98 connected to a collar 99 having a hollow center therethrough for the passage of supplementary combustion air to the furnace. An automatic igniter 100 having a spark plug 101 and an igniting gas inlet 102 may be provided as more fully set forth in United States patent application Serial No. 114,772, filed September 9, 1949, in the name of Willard J. Hatton. Such an automatic igniter facilitates the kindling of a fuel bed in the furnace in the event of an accidental out-fire and, further, reignites a fuel bed in the furnace following the time when furnace controls are so set that combustion is purposely lost at times of no heat demand. In residences and small buildings during very mild weather especially even the small heat release of hold-fire conditions may occasion an uncomfortable temperature within the home or building.

A combustion chamber 103 normally extends between a plane of ignition in the confined upper tubular portion thereof, generally represented by wall portions 88 and 89, and the top of a rotating base plate 104 at the bottom of the broadened portion of combustion chamber 103. Base 104 is mounted in coaxial relation to jacket 79. A conical grate 105 is rigidly affixed to base 104 eccentrically of the center thereof so that a vertical lower circular edge 106 at the base of grate 105 is internally tangent to the periphery of plate 104. Recesses 107 are equally spaced around the conical surface of grate 105 and extend from the top of edge 106 a substantial distance toward the apex of the grate. Recesses 107 usually are cast or milled and have flat bottoms which are so angled relative the conical surface of grate 105 that a shoulder 108 is produced opposed to the direction of rotation of base 104. A supplementary combustion air inlet port 109 extends through each shoulder 108 along at least a part of the length thereof. These recesses are adapted to promote the descent and eventual crushing of any small clinker particles which may be formed during operation. A hub 110 is keyed to a hollow shaft 111 in turn keyed to and turned by a ratchet wheel 112. The lower horizontal bearing surface of hub 110 supports the fuel bed and the grate mechanism by being mounted in thrust engagement against a bearing boss 113 integral with a closure plate 114 forming the bottom of an ash pit 115 beneath base 104. A bottom plate 116 constitutes a fixed bottom for casing 70 including wall 73 to which it is welded or otherwise sealed to avoid any leakage from outer boiler portion 72. Plate 116 also has openings sealed around the lower reduced ends 117 of the respective cyclones 74 where they pass through. Plate 116 further has an opening therein to accommodate the insertion and removal of the grate mechanism and a crushing wall liner 118. This opening is ringed by a depending flange 119 snugly fitting around the periphery of closure plate 114 which is tapped for engagement by bolts passing through flange 119. Crushing wall 118 fits snugly against a lower annular portion of wall 73 which is set back so that the interior of liner 118 and of wall 73 present a substantially unbroken vertical surface. Vertical grooves 120 are disposed around the inside of liner 118 and cooperate with recesses 107, the periphery of plate 104 and the tangential portion of edge 106 in reducing any small clinkers that may tend to be formed so that the fragments thereof will pass through the clearance space between base 104 and liner 118 and fall into ash pit 115. An ash removal duct 121 is connected to ash pit 115 through closure plate 114 and the contents of ash pit 115 are fed into duct 121 by means of a depending sweep 122 adjustably connected to the bottom of base 104 so the clearance thereof above the floor of ash pit 115 may be varied as desired.

A grate pan 123 underlies closure plate 114 and surrounds lower hub portion 124 of plate 114 which lower hub portion guides shaft 111. Pan 123 is fastened to bottom 116 by stud bolts 125. Bearings 126 are interposed between the hub of ratchet wheel 112 and stationary collar 99 and the non-rotating hub 124. If desired, roller bearings may be interposed between hub 113 and base 104. The lower end of hollow shaft 111 forms a sliding fit with the upper end of duct 98 adjacent collar 99 in which conventional gasket sealing means are provided to prevent the escape of air. In addition, any leakage of air from the furnace system of this invention is avoided as much as possible by making all joints tight.

*Driving mechanism for further embodiment*

A rigid base 130 is positioned adjacent the bottom of the furnace and has mounted thereon an electric motor 130' having a shaft 132 coupled to a shaft 133 of a centrifugal water pump 134 which is also mounted on base 130. Water to be heated is supplied to pump 134 through a line 135 and is delivered through a line 136 to inlet 85. A second motor 131 has its shaft 137 coupled to a power input shaft 138 of a gear train enclosed within a gear box 139. Shaft 138 extends through gear box 139 and is coupled to a shaft 140 which operates a rotary fan blower 141, the outlet of which is connected to duct 96 to supply combustion air to the furnace system. A worm gear 142 on shaft 138 rotates a worm wheel 143 which in turn rotates a double-ended sprocket shaft 144. A sprocket 145 keyed to one end of shaft 144 operates the ash removal screw. A sprocket 146 at the other end of shaft 144 operates a coal feed screw. A plate 147 is bolted to the end of shaft 144 adjacent sprocket 145 and has a stud bolt 148 serving as an eccentric pivot for a connecting bar 149. Connecting bar 149 is in turn pivoted to a double ratchet arm 150 spanning both sides of ratchet wheel 112. Ratchet arm 150 is integral with bearings 126 which are a part thereof. Between the sides of arm 150 a ratcheting pawl 151 is pivotally mounted for respective engagement with teeth 152 around the periphery of ratchet wheel 112. A spring 153 urges pawl 151 into engagement with teeth 152. Hence, rotation of shaft 144 causes an intermittent angular advancement of wheel 112 and corresponding movement of grate 105. Various conventional means may be used, which are not illustrated, for varying the speed of ratchet wheel 112. In general, the speed of the ratchet wheel 112 may be set somewhat lower for expected fuels having lower ash contents and, further, such speed should not be so high as to increase the amount of combustible normally to be found in the ash.

A horizontal shaft 154 is mounted in a bracket 155 on a base plate 156 above base 130. A sprocket 157 is keyed to the outer end of shaft 154 and is turned by sprocket 146 through a chain 158. The inner end of shaft 154 turns an inclined shaft 159 through a universal coupling 160. Shaft 159 is journaled at its upper end in a bearing 164 integral with cap piece 92. A bevel gear 165 is keyed in fixed position to shaft 159.

Within conduit 94 a coal feed screw 168 is positioned, the shaft of which is keyed to a bevel gear 169 having a hub which takes up the thrust of the screw against a bearing portion on cap 92. Bevel gear 169 is in engagement with gear 165 and hence when motor 131 is turned "on" by the control circuit, coal is fed into the furnace. The other end of conduit 94 leads into a coal hopper or bin of a conventional type for supplying coal to stoker screws.

*Ash removal mechanism for further embodiment*

Duct 121 is joined to an inlet 170 integral with a closed ash removal screw conduit 171. A shaft 172 in conduit 171 has screws of opposite hands extending outwardly from each side of the center thereof. A sprocket 173 is keyed to shaft 172 and turns shaft 172 by means of a chain 174 which is also in engagement with sprocket 145. Inlet 170 is adjacent the midpoint of conduit 171 which midpoint receives ashes forced toward it by both screws causing the ashes to enter a discharge chute 175 surrounding conduit 171. The outer end of discharge chute 175 opens into an ash bin 176 having a removable cover 177 facilitating the emptying of the ashes in bin 176. Ducts 178 respectively lead from reduced portions 117 of the respective cyclones 74 to inlets into conduit 171 adjacent thereto. In this way, ashes from ash pit 115 and ash removed from the combustion gases by cyclones 74 are taken by the ash removal screws and emptied into receiver 176.

Before passing through cyclones 74, the gaseous combustion products transfer heat to the respective water jackets particularly through walls 73 and 80. The cooled gaseous combustion products rise in cyclones 74 and pass out through a stack 179.

*Conventional control suitable for new furnace system*

Figure 17:
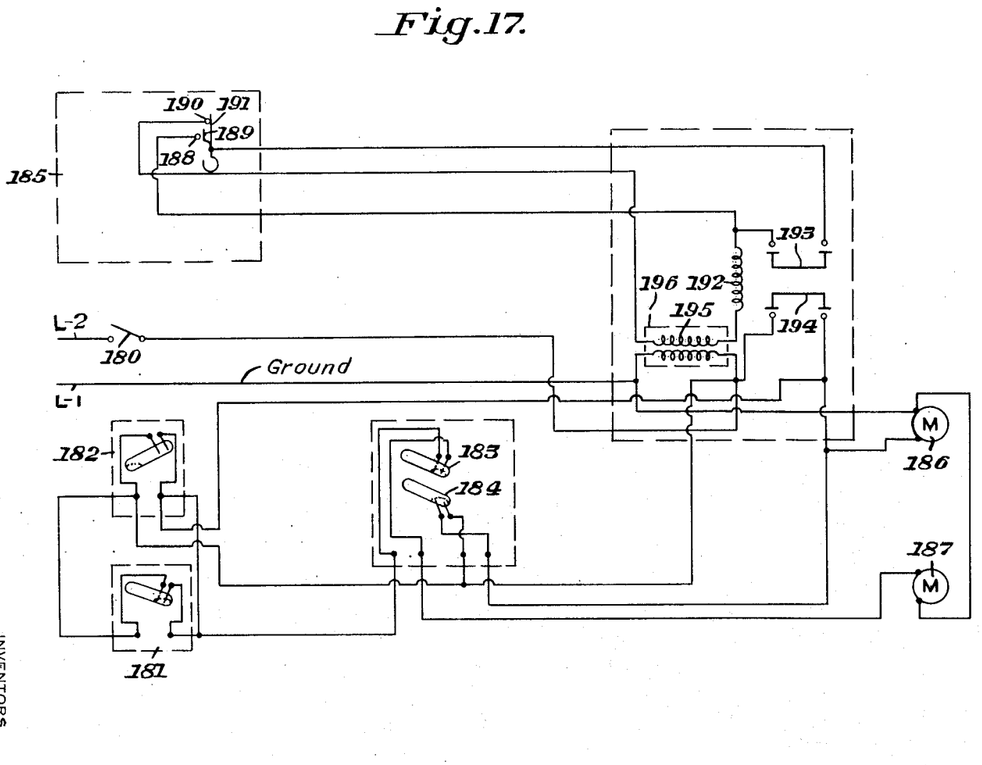
Figure 17 is a diagrammatic representation of a conventional heat-demand control system suitable for use with a furnace system of this invention such as those illustrated in this application.

A number of the conventional heat demand control systems used in homes and small buildings may be applied to the furnace system of this invention to effect the automatic operation thereof. By way of illustration only, one such control is illustrated in Figure 17 herein. In this figure electric power is obtained across lines L-1 and L-2 to which the control circuit is connected through a switch 180. A low-limit mercury switch 181 guarantees a predetermined minimum water temperature; a normally open mercury stack switch 182 guarantees proper ignition conditions; a normally closed high-limit mercury switch 183 prevents excessive temperatures in the furnace system; and an over-run control mercury switch 184 prevents overheating of the boiler water by circulating cooler water when the temperature of the heated water tends to exceed a predetermined maximum. A motor 186, which may be similar to motor 130', controls the circulation of water in the furnace system. A motor 187, which may be similar to motor 131 or motor 33, controls the coal feed and the combustion air blower. Upon a call for increased temperature by a room thermostat 185, heat demand contacts 188 and 189 and a second pair of contacts 190 and 191 in thermostat 185 will close. The flexing of contact 191 is such that it closes with contact 190 before pair 188—189 closes and, conversely, pair 188—189 opens before pair 190—191.

This call initiates an "on" period for motors 186 and 187 through a relay 192, the energization of which respectively closes contact bars 193 and 194. As soon as the temperature call begins to be met, contacts 188—189 open but a holding circuit remains closed through a secondary winding 195 of a transformer 196 and contacts 190—191. When the temperature demand is met, thermostat 185 breaks contacts 190—191 opening contact bars 193 and 194 and stopping motor 186. Motor 187 is stopped whenever switch 181 opens upon reaching a predetermined increase in the temperature of the water in the system required to satisfy the temperature call. Switch 181 will remain open until the water temperature in the boiler falls below the preset minimum. So long as both switch 181 and stack switch 182 are open motor 187 and at least the fuel feed for the system will be "off," if there is no "call" for heat by room thermostat 185.

*Illustrative example*

A representative furnace system made in accordance with this invention might require a heat release of about 180,000 B. t. u. per hour for an average-size house of six rooms in the northeastern part of the United States using hot water radiation or warm water heating. On the basis of an overall furnace efficiency of 70% and a maximum operating factor of 70%, the heat output per hour will approximate 90,000 B. t. u. Setting such a maximum operating factor would permit the furnace system to be overloaded whenever necessary for short periods of time. If a bituminous coal having a heating value of about 13,360 B. t. u. per pound is used, such an output would require about 13½ pounds of fuel feed to the furnace of the system in each hour. In general, fuel requirements for such service should not exceed about 20 pounds of fuel feed each hour to satisfy the expected maximum heat demand and may be considerably less. Under hold-fire conditions, in the above-described operation, it may be assumed, for example, that between about 0.75 and 1.75 lbs. of a bituminous coal having the aforesaid heating value might be required to maintain ignition and prevent any out-fire, with such coal having a minimum heat output of about 11,000 B. t. u. per hour.

The boiler of such a furnace may have a water capacity of about 20 to 25 gallons. The combustion chamber of such a furnace might vary between about 4" and 8" in diameter in the confined portion thereof and be of sufficient height to accommodate a live fuel bed which might vary from a depth of about 7" to about 15", measured from the base plate to the plane of ignition in the confined portion of the combustion chamber. In a combustion chamber of such small size, the actual rate of burning during the "on" fuel feed periods will be very high (in the order of a rate of 50 pounds per square foot of ignition plane area per hour and up) with the result that free-burning operation is obtained even with strongly agglomerating bituminous coals. The proper presetting of the control circuit to restrict the fuel feed below the maximum burning rate potential of at least the more reactive particles therein will yield free burning action by such suppression of the ignition rate for hold-fire operation, wide size consists, and unusually troublesome agglomerating coals.

The downflow combustion air to the furnace usually has the same "on" periods as the fuel and may vary from the theoretical air value for perfect combustion to possibly about twice the theoretical value. In general, a substantial excess air setting will be required particularly for hold-fire operation. If a timer is included in the control circuit, maintenance of combustion during hold-fire periods may possibly be provided for by having an "on" fuel feed period occur possibly about four times in each hour. When supplemental combustion air is fed to the furnace system, it normally will range between about 10% and 25% of the total combustion air. On the other hand, the correlation of weight of combustion air to the weight of fuel fed is selected so as not to cause any blow-out and any supplemental combustion air must not be added in such magnitude as to aggravate any fly ash problem. Sufficient flexibility exists in the furnace system of this invention for readily understood adaptation to the variables which will be encountered in particular applications.

It will thus be seen that in this invention a small furnace is provided to which bituminous coal and air in correlative amounts are periodically or continuously fed as demand requires to the top of a live fuel bed, the upper part of which is confined in a restricted zone within the furnace. A zone of discontinuity is provided substantially at the plane of ignition so that the coal remains relatively cool until it is actually subjected to kindling conditions at the time it is so fed. Under the high rate of burning that ensues at least during the "on" periods of heat demand and hold-fire, all volatile and tarry matter released passes through the fuel bed whence the heat release potentiality thereof is recovered and smoke emission which might otherwise be caused thereby is prevented. The agglomerating properties of such volatile and tarry matter are suppressed or destroyed during such active burning and remaining agglomerating tendency, if any, is nullified by ignition suppression inherent in the predetermined presetting of the control circuit. The particles in the fuel bed gravitate downwardly into the unconfined lower portion of the combustion chamber where gaseous combustion products escape through the upper surface of said bed. Ash also gravitates downwardly through the fuel bed and out of the combustion chamber before any material clinkering thereof can take place. By agitating the grate mechanism, this continual sifting out of ash is promoted and the formation of troublesome agglomerations of fuel masses and of ash is suppressed. The proximity of liquid-cooled boiler walls help to prevent potential clinker formation. The gas-to-liquid heat transfer surfaces are also proximate and vertical to maintain high heat transfer rates and avoid deposition of soot and fly ash.

Although certain practices of this invention have been illustrated and described in the foregoing specification, it is to be understood that modifications may be made therein without departing from the spirit of the invention or the scope of the appended claims.

We claim:

1. In a heating furnace system for burning solid organic fuels including agglomerative bituminous coals, the steps comprising, maintaining a live fuel bed in a combustion zone, laterally confining the upper part of said live fuel bed in a smaller area than the area of the base of said fuel bed, maintaining fresh fuel separated from any contact with said live fuel bed, feeding that quantity of fresh fuel which can come into substantially direct contact with the confined top of said live fuel bed not to exceed a thin layer of said fresh fuel, and feeding primary combustion air downwardly past said fresh fuel so fed and into said live fuel bed substantially over the entire area of said confined top, whereby such solid organic fuels which tend to agglomerate will be prevented from caking in the course of being burned in said furnace system.

2. In a heating furnace system for burning solid organic fuels including agglomerative bituminous coals, the steps comprising, maintaining an incandescent fuel bed in a combustion zone, laterally confining the upper part of said incandescent fuel bed in a smaller area than the area of the base of said incandescent fuel bed, maintaining fresh fuel separated from any contact with said incandescent fuel bed, dropping through space that quantity of fresh fuel which can come into substantially direct contact with the confined top of said incandescent fuel bed not to exceed a thin layer of said fresh fuel, and substantially simultaneously feeding primary combustion air through said space over said fresh fuel so dropped and into said confined top of said incandescent fuel bed, whereby such solid organic fuels which tend to agglomerate will be prevented from caking in the course of being burned in said furnace system.

3. In a heating furnace system for residences and small buildings to burn solid organic fuels including agglomerative bituminous coals, the steps comprising, maintaining a live fuel bed in a combustion zone, said live fuel bed having its plane of ignition substantilaly coincident with the surface of the top of said live fuel bed, laterally confining said top of said live fuel bed in an area smaller than the area of the lower part of said live fuel bed, maintaining fresh fuel separated from any contact with said live fuel bed, passing primary air for combustion downwardly into said live fuel bed through said confined top thereof and substantially over said entire surface of said confined top, feeding a thin layer of fresh fuel to said surface of said confined top of said live fuel bed for rapid kindling of said thin layer of fresh fuel, and repeating said feeding of fresh fuel in correspondence with the heat demand requirements of said system.

4. In a heating furnace system for bituminous coals or the like, apparatus comprising, in combination, a vertical tubular jacket having upper and lower inner walls, the distance between the sides of said upper inner wall being less than the distance between the sides of said lower inner wall, the space between the sides of said lower inner wall and between the sides of the lower part of said upper inner wall defining a combustion chamber for a live fuel bed having its top confined by said lower part of said upper inner wall, said combustion chamber having a passage communicating with the portion thereof within said lower inner wall for the removal of gaseous products from said live fuel bed, a conveyor connected to said jacket to feed fresh fuel in a quantity constituting a thin layer thereof in each such feeding from a fresh fuel supply outside said inner walls, said feeding being between the sides of said upper inner wall above said confined top of said live fuel bed, an inlet duct connected to said jacket to pass primary combustion air downwardly between the sides of said upper inner wall above said confined top of said live fuel bed for distribution over substantially the entire area of said confined top, and a control for repeating said feeding in accordance with the heat demand requirements of said heating furnace system.

5. In a heating furnace system for bituminous coals or the like, apparatus comprising, in combination, a vertical tubular outer jacket member having the bottom of a combustion chamber between the sides of a lower part of the inner wall of said outer jacket member, a vertical tubular inner jacket member extending downwardly within the upper part of said outer jacket member, said inner jacket member being in coaxial relation to said outer jacket member and having an inner wall defining the top of said combustion chamber between the sides of the lower part of said last mentioned inner wall, the top of said combustion chamber being adapted to laterally confine the top of a live fuel bed in the top of said combustion chamber and having its plane of ignition substantially at the surface of said confined top of said live fuel bed, a passage between the outside of said inner jacket member and said inner wall of said outer jacket member for gaseous products from said live fuel bed, a conveyor connected to said inner jacket member to feed fresh fuel in a quantity providing not to exceed a thin layer thereof from a fresh fuel supply separated from said jacket members, said feeding being between the sides of said inner wall of said inner jacket member above the surface of said confined top of said live fuel bed, an inlet duct connected to said inner jacket member to pass primary combustion air downwardly between the sides of said inner wall of said inner jacket member above said surface of said confined top of said live fuel bed for distribution over substantially the entire area of said surface, and a control for repeating said feeding in accordance with the heat demand requirements of said heating furnace system.

6. In a heating furnace system for bituminous coals or the like, apparatus comprising, in combination, a vertical tubular outer jacket member having the bottom of a combustion chamber between the sides of a lower part of the inner wall of said outer jacket member, a vertical tubular inner jacket member extending downwardly within the upper part of said outer jacket member, said inner jacket member being in coaxial relation to said outer jacket member and having an inner wall defining the top of said combustion chamber between the sides of the lower part of said last mentioned inner wall, the top of said combustion chamber being adapted to laterally confine the top of a live fuel bed in said combustion chamber and having its plane of ignition substantially at the surface of said confined top of said live fuel bed, a horizontally movable grate extending across the bottom of said combustion chamber, an upwardly and outwardly extending passage between the outside of said inner jacket member and said inner wall of said outer jacket member for gaseous products from said live fuel bed, an ash collector connected to said combustion chamber for receiving ashes from said combustion chamber, a conveyor connected to said inner jacket member to feed fresh fuel in a quantity providing not to exceed a thin layer thereof from a fresh fuel supply outside of said jacket members, said feeding being between the sides of said inner wall of said inner jacket member above the surface of said confined top of said live fuel bed, a fan to feed primary combustion air downwardly between the sides of said inner wall of said inner jacket member above said surface of said confined top of said live fuel bed for distribution over substantially the entire area of said surface, and a control for repeating said feeding in accordance with the heat demand requirements of said heating furnace system.

WILLARD J. HATTON.
RALPH A. SHERMAN.

References Cited in the file of this patent

UNITED STATES PATENTS

| Number | Name | Date |
|---|---|---|
| 76,010 | Watts | Mar. 24, 1868 |
| 373,835 | Lindemuth | Nov. 29, 1887 |
| 481,216 | Watson | Aug. 23, 1892 |
| 595,339 | Rahner | Dec. 14, 1897 |
| 619,709 | Bair | Feb. 21, 1899 |
| 902,714 | Cope | Nov. 3, 1908 |
| 1,416,995 | Stroud | May 23, 1922 |
| 1,548,292 | Wedge | Aug. 4, 1925 |
| 1,624,908 | Bowman | Apr. 19, 1927 |
| 1,848,873 | Hagstrum | Mar. 8, 1932 |
| 2,014,868 | Steele et al. | Sept. 17, 1935 |
| 2,180,196 | Corbett | Nov. 14, 1939 |

FOREIGN PATENTS

| Number | Country | Date |
|---|---|---|
| 433,085 | Germany | Sept. 15, 1926 |